(12) United States Patent
Aichi et al.

(10) Patent No.: US 9,085,292 B2
(45) Date of Patent: Jul. 21, 2015

(54) VEHICLE

(71) Applicants: Masahiko Aichi, Kasugai (JP); Taichi Washio, Okazaki (JP)

(72) Inventors: Masahiko Aichi, Kasugai (JP); Taichi Washio, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/379,093

(22) PCT Filed: Nov. 12, 2012

(86) PCT No.: PCT/JP2012/079213
§ 371 (c)(1),
(2) Date: Aug. 15, 2014

(87) PCT Pub. No.: WO2013/121637
PCT Pub. Date: Aug. 22, 2013

(65) Prior Publication Data
US 2015/0045183 A1     Feb. 12, 2015

(30) Foreign Application Priority Data

Feb. 17, 2012  (JP) ................................. 2012-032645

(51) Int. Cl.
*B60W 10/06*  (2006.01)
*B60W 10/107*  (2012.01)
*F16H 59/18*  (2006.01)
*F16H 61/662*  (2006.01)
*F16H 9/04*  (2006.01)
*F16H 61/66*  (2006.01)

(52) U.S. Cl.
CPC ............. *B60W 10/107* (2013.01); *B60W 10/06* (2013.01); *F16H 9/04* (2013.01); *F16H 59/18* (2013.01); *F16H 61/66259* (2013.01); *B60W 2510/0604* (2013.01); *F16H 2061/6611* (2013.01); *F16H2061/6615* (2013.01); *Y10T 477/6237* (2015.01); *Y10T 477/688* (2015.01)

(58) Field of Classification Search
CPC ................... B60W 10/107; B60W 2510/0604;
F16H 59/18; F16H 61/66259; Y10T 477/6237;
Y10T 477/688
USPC ........................................ 477/44, 115; 701/57
See application file for complete search history.

(56) References Cited

U.S. PATENT DOCUMENTS 4,750,598 A * 6/1988 Danno et al. .................. 477/110
5,474,508 A    12/1995 Kondo et al.
(Continued)

FOREIGN PATENT DOCUMENTS

| JP | 1-172669 | 7/1989 |
| JP | 4-203557 | 7/1992 |
| JP | 6-34033 | 2/1994 |
| JP | 11-6561 | 1/1999 |

(Continued)

OTHER PUBLICATIONS

International Search Report issued Feb. 12, 2013, in PCT/JP12/079213, filed Nov. 12, 2012.

*Primary Examiner* — Roger Pang
(74) *Attorney, Agent, or Firm* — Oblon, McClelland, Maier & Neustadt, L.L.P.

(57) ABSTRACT

In a vehicle including a continuously variable transmission, an ECU sets an accelerator opening degree for shift control in accordance with an actual accelerator opening degree and controls shifting of the continuously variable transmission by using accelerator opening degree for shift control. The ECU updates accelerator opening degree for shift control whenever an amount of increase in actual accelerator opening degree with respect to accelerator opening degree for shift control reaches a prescribed value or whenever an amount of decrease in actual accelerator opening degree with respect to accelerator opening degree for shift control reaches a prescribed value.

6 Claims, 8 Drawing Sheets

(56) References Cited

U.S. PATENT DOCUMENTS

2001/0056006 A1* 12/2001 Makiyama et al. ............ 477/44
2003/0060961 A1   3/2003 Ishizu et al.
2013/0165295 A1*  6/2013 Kabe et al. .................... 477/37

FOREIGN PATENT DOCUMENTS

| JP | 2001099290 A | * | 4/2001 |
| JP | 2003-170759 | | 6/2003 |
| JP | 2010-112397 | | 5/2010 |

* cited by examiner

VEHICLE

TECHNICAL FIELD

The present invention relates to a vehicle including a continuously variable transmission.

BACKGROUND ART

Japanese Patent Laying-Open No. 2010-112397 (PTD 1) discloses the technique of, in such a vehicle that an accelerator opening degree for shift control is set in accordance with an actual accelerator opening degree and shifting of a continuously variable transmission is controlled by using the accelerator opening degree for shift control, providing a dead zone (hysteresis) between the actual accelerator opening degree and the accelerator opening degree for shift control, fixing the accelerator opening degree for shift control without increasing the same until the actual accelerator opening degree increases by the hysteresis, and linearly increasing the accelerator opening degree for shift control in accordance with an increase in the actual accelerator opening degree after the actual accelerator opening degree increases by the hysteresis.

CITATION LIST

Patent Document

PTD 1: Japanese Patent Laying-Open No. 2010-112397
PTD 2: Japanese Patent Laying-Open No. 1-172669

SUMMARY OF INVENTION

Technical Problem

According to the technique in PTD 1, in a case where the user increases an amount of pressing down an accelerator pedal, the accelerator opening degree for shift control is increased in a stepwise manner only when the actual accelerator opening degree increases by the hysteresis, and thereafter, the accelerator opening degree for shift control is linearly increased in accordance with the increase in the actual accelerator opening degree. In other words, the accelerator opening degree for shift control is increased in a stepwise manner only the first time, and is not increased in a stepwise manner afterwards. Thus, an acceleration feeling at the time of pressing down the accelerator pedal cannot be directly provided to the user.

The present invention has been made to solve the aforementioned problem and an object thereof is to directly provide a user with an acceleration feeling at the time of pressing down an accelerator pedal in a vehicle including a continuously variable transmission.

Solution to Problem

A vehicle according to the present invention includes: an engine; a driving wheel; a continuously variable transmission provided between the engine and the driving wheel; and a control device that sets an accelerator opening degree for shift control by using an actual accelerator opening degree and controls the continuously variable transmission in accordance with the accelerator opening degree for shift control. When setting the accelerator opening degree for shift control, the control device updates the accelerator opening degree for shift control to a value corresponding to the actual accelerator opening degree whenever a difference between the actual accelerator opening degree and the accelerator opening degree for shift control exceeds a prescribed amount, and maintains the accelerator opening degree for shift control at a value updated the last time, when the difference does not exceed the prescribed amount.

Preferably, when the actual accelerator opening degree is equal to or higher than a first threshold value, the control device sets the accelerator opening degree for shift control to the value corresponding to the actual accelerator opening degree, regardless of whether the difference exceeds the prescribed amount or not.

Preferably, when the actual accelerator opening degree is less than a second threshold value lower than the first threshold value, the control device sets the accelerator opening degree for shift control to the value corresponding to the actual accelerator opening degree, regardless of whether the difference exceeds the prescribed amount or not.

Preferably, the control device sets a target input shaft rotation speed of the continuously variable transmission in accordance with the accelerator opening degree for shift control and controls the continuously variable transmission such that an actual input shaft rotation speed of the continuously variable transmission becomes the target input shaft rotation speed. The control device sets a first shift speed of the target input shaft rotation speed and a second shift speed of the target input shaft rotation speed to different values, the first shift speed being a shift speed when the actual accelerator opening degree increases from less than the first threshold value to the first threshold value or a higher value, and the second shift speed being a shift speed when the actual accelerator opening degree decreases from the first threshold value or the higher value to less than the first threshold value.

Preferably, the control device sets the first shift speed to be higher than the second shift speed.

Preferably, the control device further sets an accelerator opening degree for engine control by using the actual accelerator opening degree and controls an output of the engine in accordance with the accelerator opening degree for engine control. When setting the accelerator opening degree for engine control, the control device sets the accelerator opening degree for engine control to the value corresponding to the actual accelerator opening degree.

Advantageous Effects of Invention

According to the present invention, in the vehicle including the continuously variable transmission, the acceleration feeling at the time of pressing down the accelerator pedal can be directly provided to the user.

DESCRIPTION OF EMBODIMENTS

Embodiments of the present invention will be described hereinafter with reference to the drawings. In the following description, the same reference characters are given to the same components. Their names and functions are also the same. Therefore, detailed description on them will not be repeated.

First Embodiment

Figure 1:
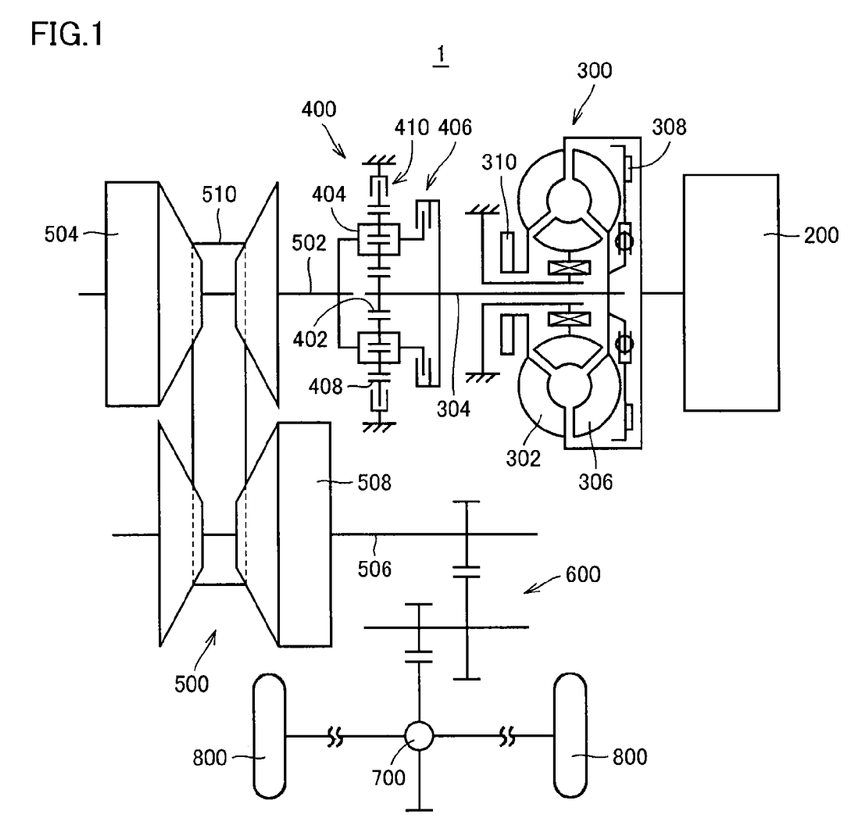
FIG. 1 is a diagram showing a schematic configuration of a vehicle.

FIG. 1 is a diagram showing a schematic configuration of a vehicle 1 according to the present embodiment. Motive power of an engine 200 is transmitted to a driving wheel 800, whereby this vehicle 1 runs. On a motive power transmission path from engine 200 to driving wheel 800, a torque converter 300 with a lockup clutch 308, a forward and backward movement clutch 400, a belt-type continuously variable transmission 500, a deceleration gear 600, and a differential gear mechanism 700 are provided.

An output of engine 200 is inputted to continuously variable transmission 500 through torque converter 300 and forward and backward movement clutch 400. An output of continuously variable transmission 500 is transmitted to deceleration gear 600 and differential gear mechanism 700, and is divided into right and left driving wheels 800. A chain-type or toroidal-type continuously variable transmission may be used instead of belt-type continuously variable transmission 500.

Torque converter 300 includes a pump impeller 302 coupled to a crankshaft of engine 200, a turbine runner 306 coupled to forward and backward movement clutch 400 via a turbine shaft 304, and lockup clutch 308 provided between pump impeller 302 and turbine runner 306.

Lockup clutch 308 is engaged or disengaged in accordance with the hydraulic pressure supplied from outside. Lockup clutch 308 is engaged, whereby pump impeller 302 and turbine runner 306 rotate integrally. Pump impeller 302 is provided with a mechanical oil pump 310 that generates the hydraulic pressure.

Forward and backward movement clutch 400 is a clutch for motive power transmission provided between torque converter 300 and continuously variable transmission 500. Forward and backward movement clutch 400 is configured by a double pinion-type planetary gear mechanism. Turbine shaft 304 of torque converter 300 is coupled to a sun gear 402. An input shaft 502 of continuously variable transmission 500 is coupled to a carrier 404. Carrier 404 and sun gear 402 are coupled via a forward clutch 406. A ring gear 408 is fixed to a housing via a reverse brake 410. Forward clutch 406 and reverse brake 410 are engaged or disengaged in accordance with the hydraulic pressure supplied from outside.

When forward clutch 406 is engaged and reverse brake 410 is disengaged, forward and backward movement clutch 400 enters a forward movement motive power transmission state where the driving force in the forward movement direction is transmitted to continuously variable transmission 500. When forward clutch 406 is disengaged and reverse brake 410 is engaged, forward and backward movement clutch 400 enters a backward movement motive power transmission state where the driving force in the backward movement direction is transmitted to continuously variable transmission 500. When forward clutch 406 is disengaged, forward and backward movement clutch 400 enters a neutral state where the motive power transmission is interrupted.

Continuously variable transmission 500 is configured by a primary pulley 504 provided at input shaft 502, a secondary pulley 508 provided at an output shaft 506, and a power transmission belt 510 wound around these pulleys. The friction force between each pulley and power transmission belt 510 is used for motive power transmission.

By controlling the hydraulic pressure of a hydraulic cylinder of primary pulley 504, the groove width of each pulley is changed. As a result, the winding radius of power transmission belt 510 is changed and a shift ratio $\gamma$ (=input shaft rotation speed NIN/output shaft rotation speed NOUT) is continuously changed.

Figure 2:
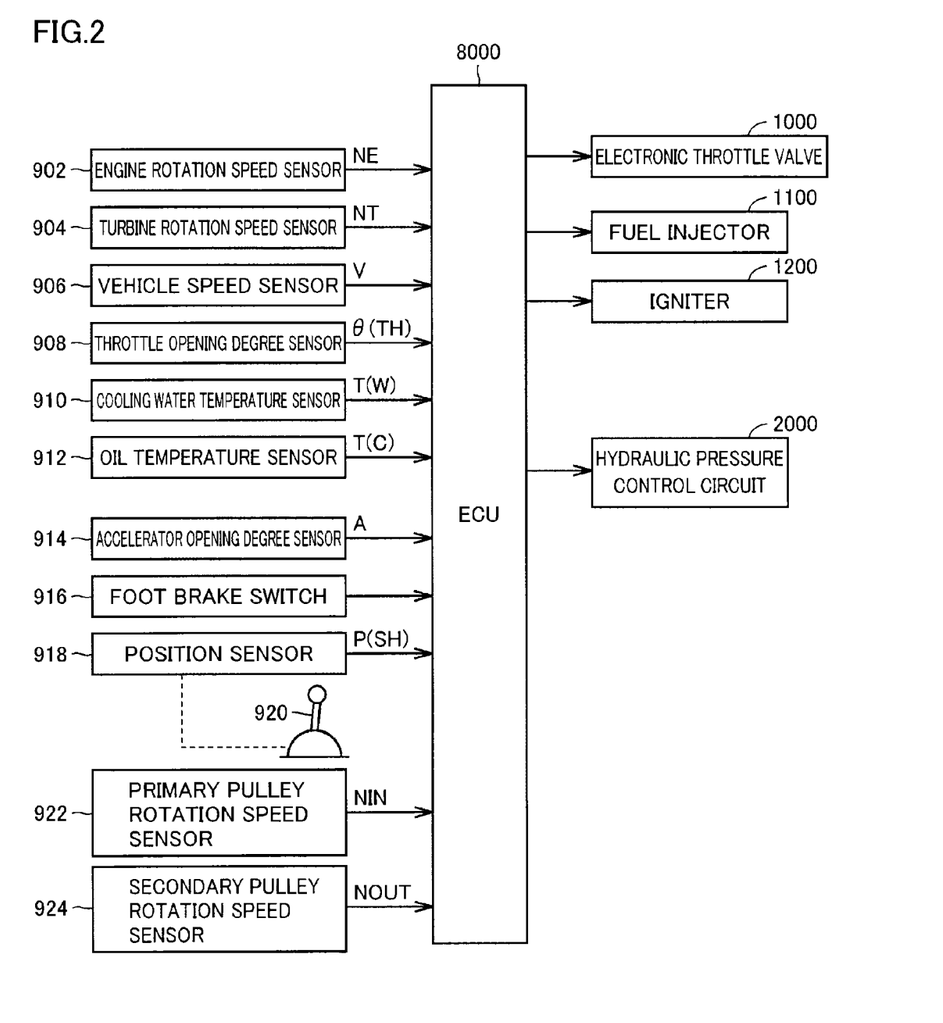
FIG. 2 is a control block diagram showing an ECU and devices connected to the ECU.

FIG. 2 is a control block diagram showing an ECU (Electronic Control Unit) 8000 that controls devices in vehicle 1, and devices connected to ECU 8000.

As shown in FIG. 2, an engine rotation speed sensor 902, a turbine rotation speed sensor 904, a vehicle speed sensor 906, a throttle opening degree sensor 908, a cooling water temperature sensor 910, an oil temperature sensor 912, an accelerator opening degree sensor 914, a foot brake switch 916, a position sensor 918, a primary pulley rotation speed sensor 922, and a secondary pulley rotation speed sensor 924 are connected to ECU 8000.

Engine rotation speed sensor 902 detects a rotation speed of engine 200 (hereinafter referred to as "engine rotation speed NE"). Turbine rotation speed sensor 904 detects a rotation speed of turbine shaft 304 (hereinafter referred to as "turbine rotation speed NT"). Vehicle speed sensor 906 detects a vehicle speed V. Throttle opening degree sensor 908 detects an opening degree $\theta$ (TH) of an electronic throttle valve. Cooling water temperature sensor 910 detects a cooling water temperature T (W) of engine 200. Oil temperature sensor 912 detects an oil temperature T (C) of continuously variable transmission 500 and the like. Accelerator opening degree sensor 914 detects an accelerator opening degree (an amount of operation of an accelerator pedal by the user) A. Foot brake switch 916 detects the presence or absence of the operation of a foot brake. Position sensor 918 detects a position P (SH) of a shift lever 920 operated by the user. Primary pulley rotation speed sensor 922 detects a rotation speed of primary pulley 504 (hereinafter referred to as "input shaft rotation speed NIN"). Secondary pulley rotation speed sensor 924 detects a rotation speed of secondary pulley 508 (hereinafter referred to as "output shaft rotation speed NOUT"). Turbine rotation speed NT matches input shaft rotation speed NIN when forward and backward movement clutch 400 is in the forward movement motive power transmission state. Vehicle speed V is set to a value corresponding to output shaft rotation speed NOUT. Accordingly, when the vehicle is in a stopped state and forward clutch 406 is in the engaged state, turbine rotation speed NT becomes zero. Each sensor sends a signal indicating the result of detection to ECU 8000.

ECU 8000 controls the output of engine 200 by controlling an electronic throttle valve 1000, a fuel injector 1100, an igniter 1200 and the like. ECU 8000 also executes engagement control of lockup clutch 308 and forward and backward movement clutch 400, shift control of continuously variable transmission 500, and the like by controlling a hydraulic pressure control circuit 2000.

Figure 3:
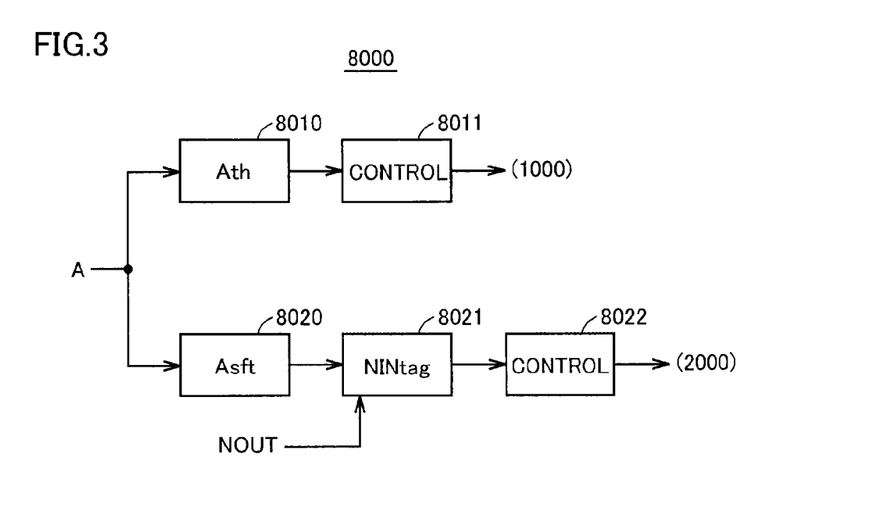
FIG. 3 is a functional block diagram of the ECU.

FIG. 3 is a functional block diagram of ECU 8000 about portions related to throttle control and shift control. Each functional block shown in FIG. 3 may be implemented by hardware or may be implemented by software.

ECU 8000 includes a setting unit 8010, a throttle control unit 8011, setting units 8020 and 8021, and a shift control unit 8022.

Setting unit 8010 sets an accelerator opening degree used in throttle control (hereinafter referred to as "accelerator opening degree for throttle control Ath"), by using accelerator opening degree A (hereinafter referred to as "actual accelerator opening degree A") detected by accelerator opening degree sensor 914. Setting unit 8010 sets actual accelerator opening degree A to accelerator opening degree for throttle control Ath. Therefore, accelerator opening degree for throttle control Ath changes similarly to actual accelerator opening degree A.

Throttle control unit 8011 controls electronic throttle valve 1000 such that the opening degree of electronic throttle valve 1000 (hereinafter referred to as "throttle opening degree θ") becomes an opening degree corresponding to accelerator opening degree for throttle control Ath. As a result, throttle opening degree θ is increased in accordance with an amount of pressing down the accelerator pedal by the user.

On the other hand, setting unit 8020 sets an accelerator opening degree used in shift control (hereinafter referred to as "accelerator opening degree for shift control Asft"), by using actual accelerator opening degree A. In other words, in the present embodiment, accelerator opening degree for throttle control Ath and accelerator opening degree for shift control Asft are separately set. Setting unit 8020 does not set actual accelerator opening degree A to accelerator opening degree for shift control Asft but provides a dead zone (hysteresis) whenever accelerator opening degree for shift control Asft is updated, thereby changing accelerator opening degree for shift control Asft in a stepwise manner. More specifically, setting unit 8020 updates accelerator opening degree for shift control Asft to a value corresponding to actual accelerator opening degree A whenever a difference between actual accelerator opening degree A and accelerator opening degree for shift control Asft exceeds a prescribed amount. When the difference does not exceed the prescribed amount, setting unit 8020 maintains accelerator opening degree for shift control Asft at a value updated the last time, even if actual accelerator opening degree A increases or decreases. This is one of the most characteristic points in the present embodiment. This will be described in detail later with reference to FIGS. 4 and 5.

Setting unit 8021 sets a target value of input shaft rotation speed NIN (hereinafter referred to as "target input shaft rotation speed NINtag") by using accelerator opening degree for shift control Asft and output shaft rotation speed NOUT. Setting unit 8021 sets target input shaft rotation speed NINtag to a larger value as accelerator opening degree for shift control Asft becomes larger.

An example of a method for setting target input shaft rotation speed NINtag will be described hereinafter. Setting unit 8021 sets target input shaft rotation speed NINtag in accordance with the following equation (1):

$$NINtag = Nbase + \Delta N(Asft) + \Delta N(NOUT) \quad (1)$$

where "Nbase" is a fixed value that serves as a base of target input shaft rotation speed NINtag. "ΔN(Asft)" is a correction value for changing target input shaft rotation speed NINtag in accordance with a change in accelerator opening degree for shift control Asft. "ΔN(NOUT)" is a correction value for adjusting target input shaft rotation speed NINtag in accordance with a change in vehicle speed V (i.e., output shaft rotation speed NOUT) such that shift ratio γ is not changed while accelerator opening degree for shift control Asft does not change (while accelerator opening degree for shift control Asft is maintained at the value updated the last time).

By using a predetermined map, setting unit 8021 obtains correction value ΔN(Asft) corresponding to accelerator opening degree for shift control Asft and obtains correction value ΔN(NOUT) corresponding to output shaft rotation speed NOUT. Then, setting unit 8021 substitutes set correction values ΔN(Asft) and ΔN(NOUT) into the aforementioned equation (1) and calculates target input shaft rotation speed NINtag.

The aforementioned equation (1) is merely one example and any equations may be used as long as it is for setting target input shaft rotation speed NINtag such that target input shaft rotation speed NINtag is increased in accordance with at least an increase in accelerator opening degree for shift control Asft.

Figure 4:
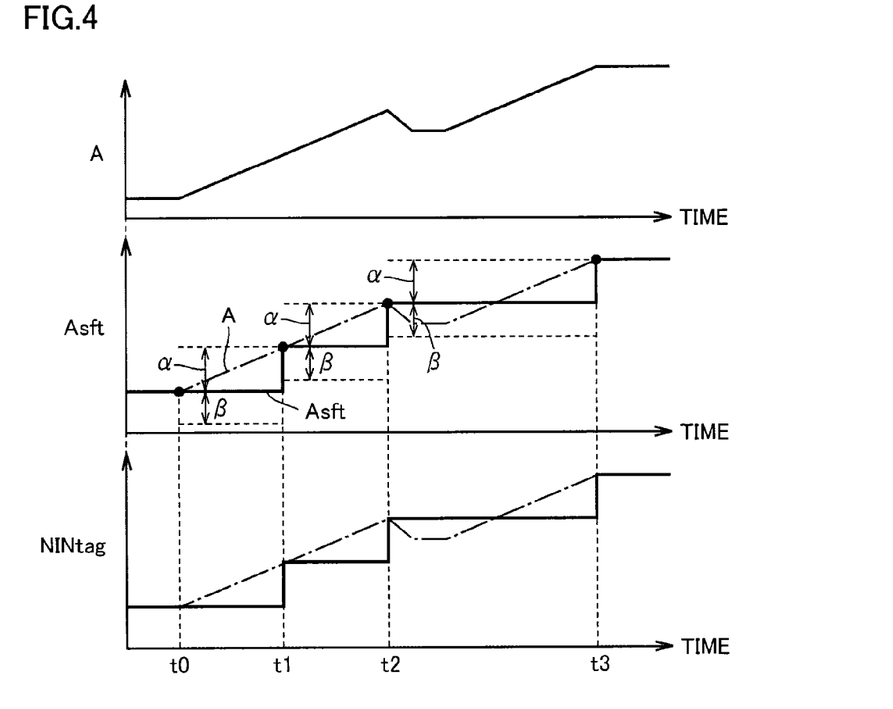
FIG. 4 is a diagram (No. 1) illustrating waveforms of an actual accelerator opening degree A, an accelerator opening degree for shift control Asft, and a target input shaft rotation speed NINtag.

FIG. 4 is a diagram illustrating waveforms of actual accelerator opening degree A, accelerator opening degree for shift control Asft, and target input shaft rotation speed NINtag. FIG. 4 shows a case where vehicle speed V (output shaft rotation speed NOUT) is constant.

A method for setting accelerator opening degree for shift control Asft by setting unit 8020 will be described with reference to FIG. 4.

Assume that accelerator opening degree for shift control Asft is updated at time t0. After time t0, actual accelerator opening degree A increases, whereas accelerator opening degree for shift control Asft is maintained at a value updated the last time (time t0), while an amount of increase in actual accelerator opening degree A with respect to accelerator opening degree for shift control Asft (=A−Asft) is less than a prescribed value α (α>0). Then, at time t1 when the amount of increase in actual accelerator opening degree A (=A−Asft) reaches prescribed value α, accelerator opening degree for shift control Asft is increased by prescribed value α in a stepwise manner and updated to a value corresponding to actual accelerator opening degree A. Similarly, after time t1 as well, accelerator opening degree for shift control Asft is not updated while the amount of increase in actual accelerator opening degree A (=A−Asft) is less than prescribed value α, and accelerator opening degree for shift control Asft is increased by prescribed value α in a stepwise manner at time t2 when the amount of increase in actual accelerator opening degree A (=A−Asft) reaches prescribed value α.

When actual accelerator opening degree A decreases, accelerator opening degree for shift control Asft is basically decreased in a stepwise manner in accordance with the similar method. More specifically, accelerator opening degree for shift control Asft is maintained at a value updated the last time, while an amount of decrease in actual accelerator opening degree A with respect to accelerator opening degree for shift control Asft (=Asft−A) is less than a prescribed value β (β>0), and accelerator opening degree for shift control Asft is decreased by prescribed value β in a stepwise manner when the amount of decrease in actual accelerator opening degree A (=Asft−A) reaches prescribed value β. In the example shown in FIG. 4, actual accelerator opening degree A decreases for a while after time t2. However, accelerator opening degree for shift control Asft is not updated because the amount of decrease in actual accelerator opening degree A with respect to accelerator opening degree for shift control Asft (=Asft−A) is less than prescribed value β.

As described above, in the present embodiment, accelerator opening degree for shift control Asft is changed in a stepwise manner in accordance with the change in actual accelerator opening degree A. Therefore, target input shaft rotation speed NINtag is also changed in a stepwise manner. As a result, shift ratio γ (=NIN/NOUT) also changes in a stepwise manner. Such shift control will also be referred to as "stepwise shift control" hereinafter.

In the present embodiment, execution of the aforementioned stepwise shift control produces the following functions/effects.

First, when actual accelerator opening degree A changes only slightly, accelerator opening degree for shift control Asft does not change. Therefore, a change in inertia torque due to unnecessary shifting is not caused and reduction in response can be prevented. For example, inertia torque in the negative direction (in the deceleration direction) generated at the time of downshifting of the continuously variable transmission (when shift ratio γ increases) can be suppressed.

In addition, downshifting is executed in a stepwise manner in accordance with the increase in actual accelerator opening degree A, and thus, kick down shift occurs like a gear-type transmission and a direct feeling can be provided to the user. In other words, if actual accelerator opening degree A is set to accelerator opening degree for shift control Asft, shift ratio γ is changed continuously with respect to the behavior of actual accelerator opening degree A. Therefore, when the user slowly increases the amount of pressing down the accelerator pedal, engine rotation speed NE also increases slowly, whereas it takes time for vehicle speed V to increase. Thus, a time lag occurs between the change in engine rotation speed NE and the timing of increase in vehicle speed V, which provides an uncomfortable feeling to the user. In the present embodiment, such a problem can be solved.

Figure 5:
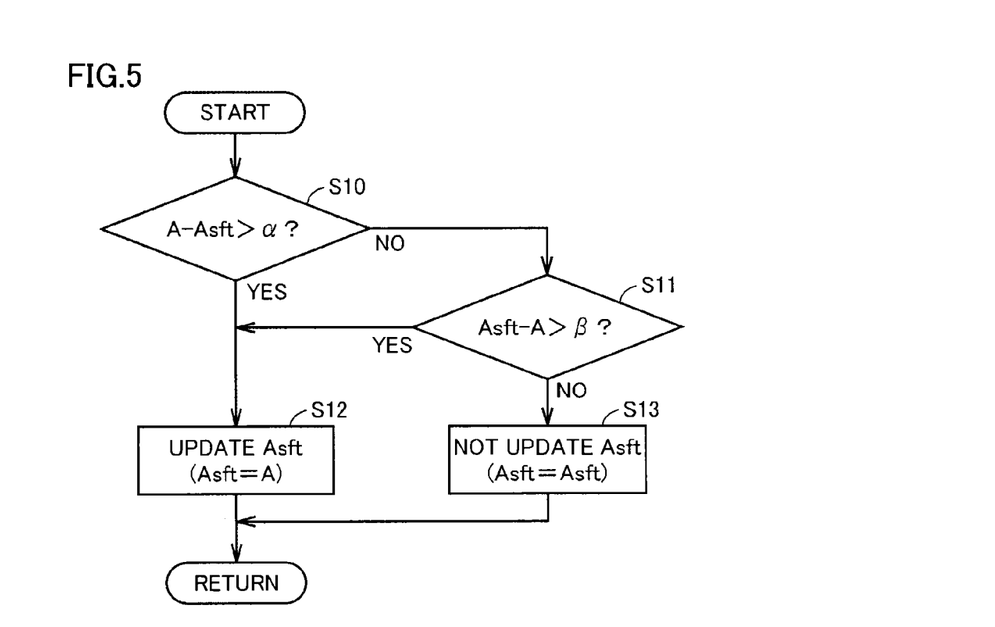
FIG. 5 is a flowchart (No. 1) showing a process procedure by the ECU.

FIG. 5 is a flowchart showing a process procedure by ECU 8000 for implementing the aforementioned function of setting unit 8020 (stepwise shift control).

In step (hereinafter the step is abbreviated as "S") 10, ECU 8000 determines whether the amount of increase in actual accelerator opening degree A with respect to accelerator opening degree for shift control Asft (=A−Asft) has reached prescribed value α or not. In S11, ECU 8000 determines whether the amount of decrease in actual accelerator opening degree A with respect to accelerator opening degree for shift control Asft (=Asft−A) has reached prescribed value β or not.

If A−Asft>α (YES in S10) or if Asft−A>β (YES in S11), the process proceeds to S12 and ECU 8000 updates accelerator opening degree for shift control Asft. As a result of this update, accelerator opening degree for shift control Asft becomes a value that matches actual accelerator opening degree A.

On the other hand, if not A−Asft>α (NO in S10) and if not Asft−A>β (NO in S11), the process proceeds to S13 and ECU 8000 does not update accelerator opening degree for shift control Asft. In other words, ECU 8000 maintains accelerator opening degree for shift control Asft at a value updated the last time.

As described above, ECU 8000 according to the present embodiment executes "stepwise shift control" in which, when setting accelerator opening degree for shift control Asft by using actual accelerator opening degree A, ECU 8000 updates accelerator opening degree for shift control Asft to actual accelerator opening degree A whenever the difference between actual accelerator opening degree A and accelerator opening degree for shift control Asft exceeds the prescribed amount, and when the difference is less than the prescribed value, ECU 8000 maintains accelerator opening degree for shift control Asft at the value updated the last time, even if actual accelerator opening degree A changes, thereby changing shift ratio γ in a stepwise manner. By this "stepwise shift control", the acceleration feeling at the time of pressing down the accelerator pedal can be directly provided to the user.

Second Embodiment

In the aforementioned first embodiment, execution of the stepwise shift control has been described.

By executing the stepwise shift control, the acceleration feeling can be directly provided to the user. However, it is also conceivable that fuel efficiency and accelerator controllability during steady-state driving are reduced or the maximum driving force at the time of fully pressing down the accelerator pedal is not obtained.

Thus, in the present embodiment, separation is made between a region where the stepwise shift control is executed and a region where normal shift control (stepless shift control or normal acceleration control described below) is executed.

Figure 6:
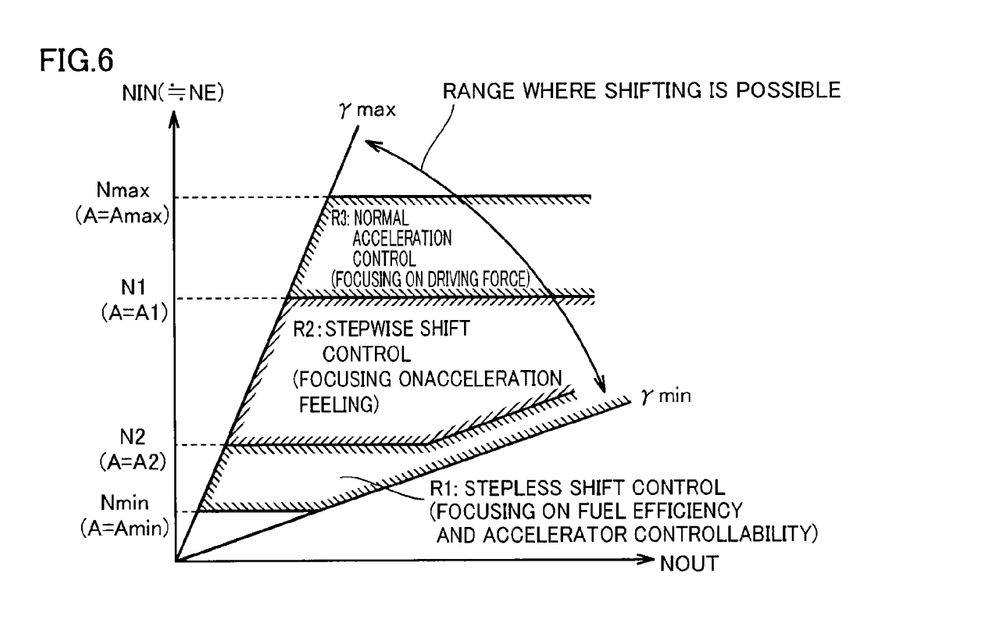
FIG. 6 is a diagram showing how to divide a shift control region.

FIG. 6 is a diagram showing how to divide the shift control region in the present embodiment. In FIG. 6, the horizontal axis represents output shaft rotation speed NOUT and the vertical axis represents input shaft rotation speed NIN. Therefore, shift ratio γ (=NIN/NOUT) corresponds to an inclination of a straight line passing through an origin point.

Due to hardware-side constraints of continuously variable transmission 500, a range where shifting is possible (range where shift ratio γ can fluctuate) is substantially limited to a range from a lower limit shift ratio γmin to an upper limit shift ratio γmax. Therefore, assuming that input shaft rotation speed NIN corresponding to the time of fully pressing down the accelerator pedal (when actual accelerator opening degree A is a minimum value Amin) is "lower limit input shaft rotation speed Nmin" and input shaft rotation speed NIN corresponding to the time of fully pressing down the accelerator pedal (when actual accelerator opening degree A is a maximum value Amax) is "upper limit input shaft rotation speed Nmax", the controllable region is a region surrounded by lower limit input shaft rotation speed Nmin, upper limit input shaft rotation speed Nmax, lower limit shift ratio γmin, and upper limit shift ratio γmax.

In the present embodiment, this controllable region is divided into three regions of a first region R1, a second region R2 and a third region R3, and the type of shift control varies in each region.

First region R1 is a region where input shaft rotation speed NIN is less than a threshold value N2, i.e., a region where actual accelerator opening degree A is less than a prescribed value A2. In first region R1, actual accelerator opening degree A is small, and thus, ECU 8000 executes the normal stepless shift control. More specifically, ECU 8000 obtains target input shaft rotation speed NINtag corresponding to accelerator opening degree for shift control Asft, and continuously changes shift ratio γ such that actual input shaft rotation speed NIN becomes target input shaft rotation speed NINtag. As a result, the shift control can be executed, focusing on the fuel efficiency and the accelerator controllability during steady-state driving.

Second region R2 is a region where input shaft rotation speed NIN is in a range from threshold value N2 to a threshold value N1 (N1>N2), i.e., a region where actual accelerator opening degree A is in a range from prescribed value A2 to a prescribed value A1 (A1>A2). This second region R2 is a region where acceleration by pressing down the accelerator pedal is requested. Therefore, ECU 8000 executes the aforementioned stepwise shift control. As a result, the shift control can be executed, focusing on the acceleration feeling.

Third region R3 is a region where input shaft rotation speed NIN is equal to or higher than threshold value N1, i.e., a region where actual accelerator opening degree A is equal to or higher than prescribed value A2. This third region R3 is a region close to the fully pressed-down state of the accelerator pedal. Therefore, if the aforementioned stepwise shift control is continued, update of accelerator opening degree for shift control Asft may become impossible. In other words, since the value of accelerator opening degree for shift control Asft updated the last time is a value close to the fully pressed-down state of the accelerator pedal, the amount of increase in actual accelerator opening degree A (=A−Asft) from the value updated the last time cannot exceed prescribed value α even if the accelerator pedal is fully pressed down subsequently, and accelerator opening degree for shift control Asft may be maintained at the value updated the last time. In this case, the driving force requested by the user is not obtained.

Thus, in third region R3, ECU 8000 executes the normal acceleration control. More specifically, ECU 8000 constantly matches accelerator opening degree for shift control Asft with actual accelerator opening degree A, thereby increasing target input shaft rotation speed NINtag to a value corresponding to actual accelerator opening degree A. As a result, engine rotation speed NE can be increased and the necessary driving force can be ensured. As described above, in third region R3, the shift control is executed, focusing on the driving force rather than the acceleration feeling. In third region R3, the stepless shift control may be executed similarly to first region R1.

Figure 7:
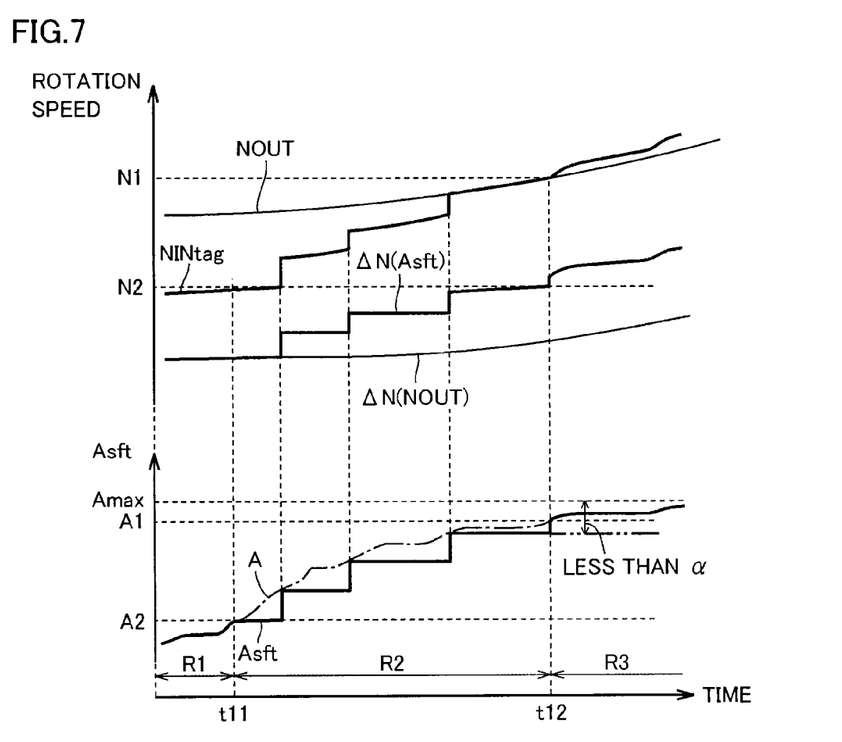
FIG. 7 is a diagram (No. 2) illustrating waveforms of actual accelerator opening degree A, accelerator opening degree for shift control Asft, and target input shaft rotation speed NINtag.

FIG. 7 is a diagram illustrating waveforms of actual accelerator opening degree A, accelerator opening degree for shift control Asft, and target input shaft rotation speed NINtag when actual accelerator opening degree A increases gradually.

Before time t11, the shift control region is in first region R1 where actual accelerator opening degree A is less than prescribed value A2, and thus, the stepless shift control is executed.

During a period from time t11 to time t12, the shift control region is in second region R2 where actual accelerator opening degree A is in the range from prescribed value A2 to prescribed value A1, and thus, the stepwise shift control is executed. Therefore, accelerator opening degree for shift control Asft is increased in a stepwise manner in accordance with the increase in actual accelerator opening degree A.

After time t12, the shift control region is in third region R3 where actual accelerator opening degree A is equal to or higher than prescribed value A1, and thus, the normal acceleration control is executed. Therefore, regardless of the value of accelerator opening degree for shift control Asft at time t12, accelerator opening degree for shift control Asft can be increased to a value that matches actual accelerator opening degree A. In other words, if the stepwise shift control is continued after time t12 as well, accelerator opening degree for shift control Asft cannot be updated (refer to a two-dot chain line) even if actual accelerator opening degree A becomes maximum value Amax, when a difference between accelerator opening degree for shift control Asft at time t12 and maximum value Amax is less than prescribed value α. In contrast, in the present embodiment, switching from the stepwise shift control to the normal acceleration control is made after time t12, and thus, accelerator opening degree for shift control Asft can be increased reliably to the value that matches actual accelerator opening degree A. As a result, target input shaft rotation speed NINtag can be further increased, engine rotation speed NE can be increased, and the necessary driving force can be ensured.

Figure 8:
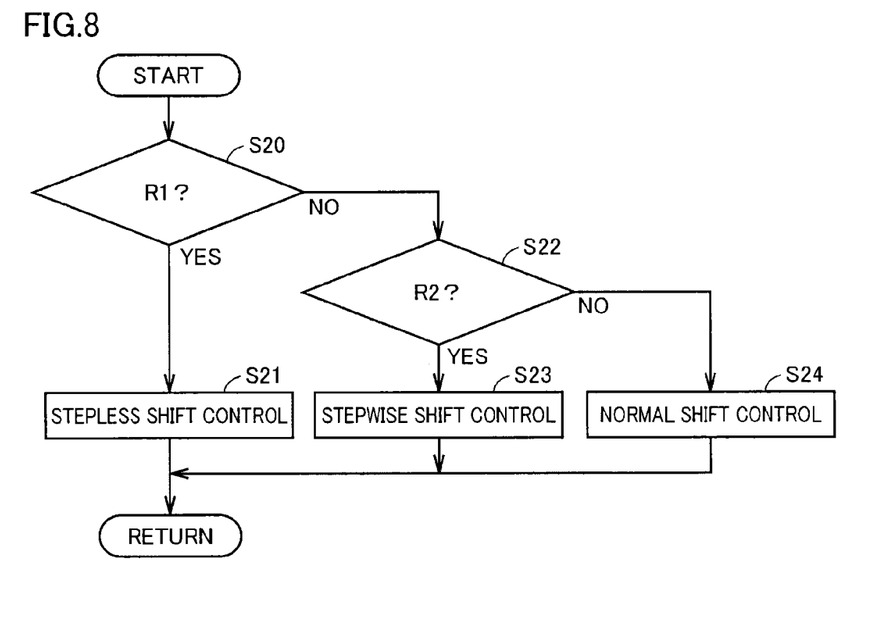
FIG. 8 is a flowchart (No. 2) showing a process procedure by the ECU.

FIG. 8 is a flowchart showing a process procedure by ECU 8000 when the type of shift control is determined.

In S20, ECU 8000 determines whether the shift control region is in first region R1 or not (whether or not actual accelerator opening degree A is less than prescribed value A2). If the shift control region is in first region R1 (YES in S20), ECU 8000 executes the stepless shift control in S21.

If the shift control region is not in first region R1 (NO in S20), ECU 8000 determines in S22 whether the shift control region is in second region R2 or not (whether or not actual accelerator opening degree A is equal to or higher than prescribed value A2 and is less than prescribed value A1). If the shift control region is in second region R2 (YES in S22), ECU 8000 executes the stepwise shift control in S23.

If the shift control region is not in second region R2 (NO in S22), i.e., if the shift control region is in third region R3, ECU 8000 executes the normal acceleration control in S24.

As described above, in the present embodiment, in the third region close to the fully pressed-down state of the accelerator pedal, switching from the stepwise shift control to the normal shift control (the normal acceleration control or the stepless shift control) is made, and thereby accelerator opening degree for shift control Asft can be increased to the value that matches actual accelerator opening degree A. As a result, high driving force requested by the user can be ensured.

Third Embodiment

In the aforementioned second embodiment, execution of the stepwise shift control in second region R2 and execution of the normal acceleration control in third region R3 have been described.

In this case, at the time of transition from second region R2 to third region R3, target input shaft rotation speed NINtag increases, and thus, downshifting is executed. Conversely, at the time of transition from third region R3 to second region R2, target input shaft rotation speed NINtag decreases, and thus, upshifting is executed.

Normally, the inertia torque is generated at the time of shifting of the continuously variable transmission, and the direction of the inertia torque differs between downshifting and upshifting. More specifically, the inertia torque in the negative direction (in the deceleration direction) is generated at the time of downshifting as already described, and the inertia torque in the positive direction (in the acceleration direction) is generated at the time of upshifting. Therefore, if target input shaft rotation speed NINtag is changed at the time of transition between second region R2 and third region R3 without taking the direction of the inertia torque into consideration, shock may occur and drivability may deteriorate.

Thus, in the present embodiment, a shift speed of target input shaft rotation speed NINtag at the time of transition from second region R2 to third region R3 and a shift speed of target input shaft rotation speed NINtag at the time of transition from third region R3 to second region R2 are set to different values. "Shift speed" herein refers to an amount of change (absolute amount) per unit time. Therefore, if an amount of increase per unit time is equal to an amount of decrease per unit time, "shift speed" has the same value.

Figure 9:
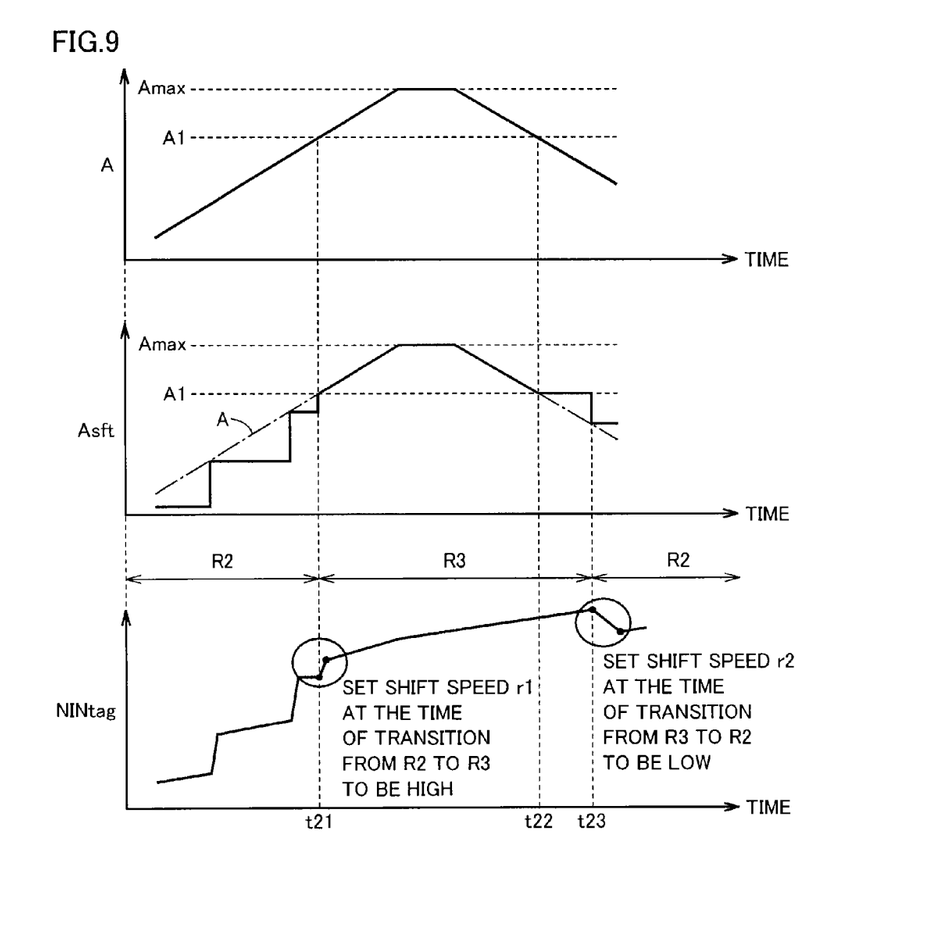
FIG. 9 is a diagram (No. 3) illustrating waveforms of actual accelerator opening degree A, accelerator opening degree for shift control Asft, and target input shaft rotation speed NINtag.

FIG. 9 is a diagram illustrating waveforms of actual accelerator opening degree A, accelerator opening degree for shift control Asft, and target input shaft rotation speed NINtag at the time of transition between second region R2 and third region R3.

Before time t21, the shift control region is in second region R2 and the stepwise shift control is executed.

When the amount of pressing down the accelerator pedal is increased and thereby actual accelerator opening degree A exceeds prescribed value A1 at time t21, the shift control region enters third region R3 and switching from the stepwise shift control to the normal acceleration control is made. At this time, downshifting is executed and the inertia torque in the negative direction is generated, although the user is requesting acceleration. Thus, at the time of transition from second region R2 to third region R3, ECU 8000 quickly increases target input shaft rotation speed NINtag at a first shift speed r1, taking the inertia torque in the negative direction into consideration, thereby implementing quick downshifting in response to the operation of the accelerator. As a result, engine rotation speed NE can be quickly increased and responsiveness of the driving force to the acceleration request by the user can be enhanced.

Thereafter, when the amount of pressing down the accelerator pedal is decreased and thereby actual accelerator opening degree A decreases to less than prescribed value A1 at time t22, the shift control region enters second region R2 again and switching from the normal acceleration control to the stepwise shift control is made. Then, at time t23, target input shaft rotation speed NINtag is decreased in a stepwise manner. At this time, upshifting is executed and the inertia torque in the positive direction is generated. Thus, at the time of transition from third region R3 to second region R2, ECU 8000 slowly decreases target input shaft rotation speed NINtag at a second shift speed r2, taking the inertia torque in the positive direction into consideration, thereby implementing slow upshifting. As a result, the inertia torque in the positive direction is lessened, and thus, shock or an abrupt acceleration feeling caused by upshifting can be suppressed. Comparing first shift speed r1 and second shift speed r2, a value of first shift speed r1 is larger than a value of second shift speed r2.

Figure 10:
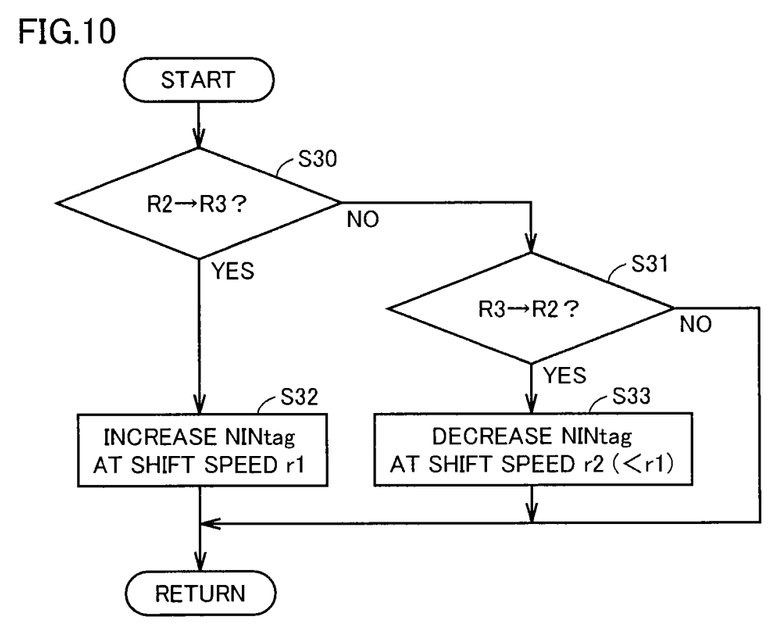
FIG. 10 is a flowchart (No. 3) showing a process procedure by the ECU.

FIG. 10 is a flowchart showing a process procedure by ECU 8000 when the shift speed of target input shaft rotation speed NINtag at the time of transition of the control region is controlled.

In S30, ECU 8000 determines whether now is the time for transition from second region R2 to third region R3 or not. In S31, ECU 8000 determines whether now is the time for transition from third region R3 to second region R2 or not.

If now is the time for transition from second region R2 to third region R3 (YES in S30), ECU 8000 increases target input shaft rotation speed NINtag at aforementioned first shift speed r1 in S32.

If now is the time for transition from third region R3 to second region R2 (YES in S31), ECU 8000 decreases target input shaft rotation speed NINtag at aforementioned second shift speed r2 in S33.

As described above, in the present embodiment, first shift speed r1 of target input shaft rotation speed NINtag at the time of transition from second region R2 (region where the stepwise shift control is executed) to third region R3 (region where the normal acceleration control is executed) by increasing the amount of pressing down the accelerator pedal is set to be different from second shift speed r2 of target input shaft rotation speed NINtag at the time of transition from third region R3 to second region R2 by decreasing the amount of pressing down the accelerator pedal. More specifically, first shift speed r1 is set to be high and second shift speed r2 is set to be low. As a result, the shift speed of target input shaft rotation speed NINtag can be set to an appropriate value in accordance with the direction of the inertia torque generated at the time of shifting of the continuously variable transmission, and deterioration of the drivability caused by shock and the like can be suppressed.

It should be understood that the embodiments disclosed herein are illustrative and not limitative in any respect. The scope of the present invention is defined by the terms of the claims, rather than the description above, and is intended to include any modifications within the scope and meaning equivalent to the terms of the claims.

REFERENCE SIGNS LIST

1 vehicle; 200 engine; 300 torque converter; 302 pump impeller; 304 turbine shaft; 306 turbine runner; 308 lockup clutch; 310 oil pump; 400 forward and backward movement clutch; 402 sun gear; 404 carrier; 406 forward clutch; 408 ring gear; 410 reverse brake; 500 continuously variable transmission; 502 input shaft; 504 primary pulley; 506 output shaft; 508 secondary pulley; 510 power transmission belt; 600 deceleration gear; 700 differential gear mechanism; 800 driving wheel; 902 engine rotation speed sensor; 904 turbine rotation speed sensor; 906 vehicle speed sensor; 908 throttle opening degree sensor; 910 cooling water temperature sensor; 912 sensor; 914 accelerator opening degree sensor; 916 foot brake switch; 918 position sensor; 920 shift lever; 922 primary pulley rotation speed sensor; 924 secondary pulley rotation speed sensor; 1000 electronic throttle valve; 1100 fuel injector; 1200 igniter; 2000 hydraulic pressure control circuit; 8000 ECU; 8010, 8020, 8021 setting unit; 8011 throttle control unit; 8022 shift control unit.

The invention claimed is:

1. A vehicle comprising:
an engine;
a driving wheel;
a continuously variable transmission provided between said engine and said driving wheel; and
a control device that sets an accelerator opening degree for shift control by using an actual accelerator opening degree and controls said continuously variable transmission in accordance with said accelerator opening degree for shift control, wherein
when setting said accelerator opening degree for shift control, said control device updates said accelerator opening degree for shift control to a value corresponding to said actual accelerator opening degree whenever a difference between said actual accelerator opening degree and said accelerator opening degree for shift control exceeds a prescribed amount, and maintains said accelerator opening degree for shift control at a value updated the last time, when said difference does not exceed said prescribed amount, and
when said actual accelerator opening degree is equal to or higher than a first threshold value, said control device sets said accelerator opening degree for shift control to the value corresponding to said actual accelerator opening degree, regardless of whether said difference exceeds said prescribed amount or not.

2. The vehicle according to claim 1, wherein
when said actual accelerator opening degree is less than a second threshold value lower than said first threshold value, said control device sets said accelerator opening degree for shift control to the value corresponding to said actual accelerator opening degree, regardless of whether said difference exceeds said prescribed amount or not.

3. The vehicle according to claim 1, wherein
said control device sets a target input shaft rotation speed of said continuously variable transmission in accordance with said accelerator opening degree for shift control and controls said continuously variable transmission such that an actual input shaft rotation speed of said continuously variable transmission becomes said target input shaft rotation speed, and
said control device sets a first shift speed of said target input shaft rotation speed and a second shift speed of said target input shaft rotation speed to different values, said first shift speed being a shift speed when said actual accelerator opening degree increases from less than said first threshold value to said first threshold value or a higher value, and said second shift speed being a shift speed when said actual accelerator opening degree decreases from said first threshold value or the higher value to less than said first threshold value.

4. The vehicle according to claim 3, wherein
said control device sets said first shift speed to be higher than said second shift speed.

5. The vehicle according to claim 2, wherein
said control device sets a target input shaft rotation speed of said continuously variable transmission in accordance with said accelerator opening degree for shift control and controls said continuously variable transmission such that an actual input shaft rotation speed of said continuously variable transmission becomes said target input shaft rotation speed, and
said control device sets a first shift speed of said target input shaft rotation speed and a second shift speed of said target input shaft rotation speed to different values, said first shift speed being a shift speed when said actual accelerator opening degree increases from less than said first threshold value to said first threshold value or a higher value, and said second shift speed being a shift speed when said actual accelerator opening degree decreases from said first threshold value or the higher value to less than said first threshold value.

6. The vehicle according to claim 5, wherein
said control device sets said first shift speed to be higher than said second shift speed.

* * * * *